(12) United States Patent
Kilday

(10) Patent No.: US 8,555,403 B1
(45) Date of Patent: Oct. 8, 2013

(54) PRIVILEGED ACCESS TO MANAGED CONTENT

(75) Inventor: Roger W. Kilday, Livermore, CA (US)

(73) Assignee: EMC Corporation, Hopkinton, MA (US)

(*) Notice: Subject to any disclaimer, the term of this patent is extended or adjusted under 35 U.S.C. 154(b) by 2023 days.

(21) Appl. No.: 11/393,081

(22) Filed: Mar. 30, 2006

(51) Int. Cl.
*G06F 21/24* (2006.01)

(52) U.S. Cl.
USPC ............................................ 726/27; 709/229

(58) Field of Classification Search
USPC ......................................................... 726/27
See application file for complete search history.

(56) References Cited

U.S. PATENT DOCUMENTS

| | | | | |
|---|---|---|---|---|
| 5,115,501 A * | 5/1992 | Kerr | | 1/1 |
| 6,412,070 B1 * | 6/2002 | Van Dyke et al. | | 726/17 |
| 6,562,076 B2 * | 5/2003 | Edwards et al. | | 715/229 |
| 6,671,695 B2 * | 12/2003 | McFadden | | 707/656 |
| 6,910,049 B2 * | 6/2005 | Fenton et al. | | 1/1 |
| 7,246,164 B2 * | 7/2007 | Lehmann et al. | | 709/225 |
| 7,263,717 B1 * | 8/2007 | Boydstun et al. | | 726/4 |
| 7,272,815 B1 * | 9/2007 | Eldridge et al. | | 717/101 |
| 7,299,275 B2 * | 11/2007 | Tsukidate et al. | | 709/223 |
| 7,383,437 B1 * | 6/2008 | Dik | | 713/164 |
| 7,428,748 B2 * | 9/2008 | Babineau et al. | | 726/5 |
| 7,475,151 B2 * | 1/2009 | Delany et al. | | 709/229 |
| 7,493,396 B2 * | 2/2009 | Alcorn et al. | | 709/225 |
| 7,565,533 B2 * | 7/2009 | Scheifler et al. | | 713/167 |
| 7,680,927 B2 * | 3/2010 | McMullen et al. | | 709/224 |
| 2001/0047485 A1 * | 11/2001 | Brown et al. | | 713/201 |
| 2002/0138763 A1 * | 9/2002 | Delany et al. | | 713/201 |
| 2002/0156879 A1 * | 10/2002 | Delany et al. | | 709/223 |
| 2002/0184444 A1 * | 12/2002 | Shandony | | 711/118 |
| 2003/0070091 A1 * | 4/2003 | Loveland | | 713/201 |
| 2003/0204566 A1 * | 10/2003 | Dhupelia et al. | | 709/205 |
| 2003/0221012 A1 * | 11/2003 | Herrmann et al. | | 709/229 |
| 2004/0181771 A1 * | 9/2004 | Anonsen et al. | | 717/100 |
| 2004/0185842 A1 * | 9/2004 | Spaur et al. | | 455/420 |
| 2004/0216150 A1 * | 10/2004 | Scheifler et al. | | 719/330 |
| 2004/0225716 A1 * | 11/2004 | Shamir et al. | | 709/204 |
| 2005/0055570 A1 * | 3/2005 | Kwan et al. | | 713/201 |
| 2005/0114541 A1 * | 5/2005 | Ghetie et al. | | 709/232 |
| 2005/0182945 A1 * | 8/2005 | Ali et al. | | 713/182 |
| 2005/0188419 A1 * | 8/2005 | Dadhia et al. | | 726/1 |
| 2005/0232423 A1 * | 10/2005 | Horvitz et al. | | 380/255 |
| 2005/0273605 A1 * | 12/2005 | Saha et al. | | 713/166 |
| 2005/0278546 A1 * | 12/2005 | Babineau et al. | | 713/185 |
| 2006/0141985 A1 * | 6/2006 | Patel et al. | | 455/410 |
| 2006/0195575 A1 * | 8/2006 | Delany et al. | | 709/225 |
| 2006/0206860 A1 * | 9/2006 | Dardinski et al. | | 717/105 |
| 2006/0277595 A1 * | 12/2006 | Kinser et al. | | 726/3 |
| 2007/0016770 A1 * | 1/2007 | Dumitru | | 713/164 |

(Continued)

*Primary Examiner* — Fikremariam A Yalew
(74) *Attorney, Agent, or Firm* — Van Pelt, Yi & James LLP

(57) ABSTRACT

Privileged access to managed content is disclosed. In some embodiments, a privileged portion of application code manages user access to managed content at a level of access greater than the user would otherwise be afforded. The privileged code moves a content management session up or down in levels of access as required to allow a user to perform through the application one or more specific actions it is desired to permit the user to do in a particular context (e.g., at a particular time in the lifecycle of an item of content and/or a particular point in a business process or work flow), including to permit the user to perform an action it is not desired to let the user perform in other contexts, such as write a particular value to a content item it is not desired to allow the user to write to otherwise.

17 Claims, 12 Drawing Sheets

(56) References Cited

U.S. PATENT DOCUMENTS

| | | | |
|---|---|---|---|
| 2007/0079364 A1* | 4/2007 | Abels et al. | 726/10 |
| 2007/0094711 A1* | 4/2007 | Corley et al. | 726/3 |
| 2007/0136790 A1* | 6/2007 | Hoffman et al. | 726/4 |
| 2009/0006856 A1* | 1/2009 | Abraham et al. | 713/183 |

* cited by examiner

| ACL | |
|---|---|
| JOE | WRITE |
| ENG DEPT | READ |
| ADMIN | DELETE |

600

| ACL | |
|---|---|
| JOE | WRITE |
| ENG DEPT | READ |
| ADMIN | DELETE |
| PROJECT ALPHA | REQUIRED GROUP |

| ACL | |
|---|---|
| JOE | WRITE |
| ENG DEPT | READ |
| ADMIN | DELETE |
| PROJECT ALPHA, ENG MGR, QA TEAM | REQUIRED GROUP SET |

| ACL | | 820 |
|---|---|---|
| JOE | WRITE | |
| ENG DEPT | READ | |
| MARK | READ RESTRICT | |
| ADMIN | DELETE | |

FIG. 8C

| ACL | | 830 |
|---|---|---|
| DAN | WRITE | |
| STATE DEPT | READ | |
| TOP SECRET | REQUIRED GROUP | |
| EUROPE REGION | REQUIRED GROUP | |

FIG. 8D

| ACL | |
|---|---|
| DAN | WRITE |
| STATE DEPT | READ |
| TOP SECRET | REQUIRED DYNAMIC GROUP |
| EUROPE REGION | REQUIRED GROUP |

| ACL | |
|---|---|
| ALAN | WRITE |
| ENG MGR | READ |
| APPROVAL APPLICATION | WRITE |
| ADMIN | DELETE |

PRIVILEGED ACCESS TO MANAGED CONTENT

BACKGROUND OF THE INVENTION

Typically, in a content management system and in other contexts in which access to electronically stored content is restricted, a user (individual, system, application, process, etc.) is permitted to access a content item if the user is included, individually or by virtue of membership in a group, in an "access control list" (ACL) associated with the content item. Group membership typically has been defined statically, such as by receiving and storing a list of individuals who are to be considered members of the group, and determined at runtime by consulting the statically defined list.

However, it would be useful to have a way to grant to a user and/or group certain rights that are to be available to the user/group in only certain contexts, e.g., to perform through an application a particular task, e.g., change a value to indicate that review has been completed and the content approved, that requires a higher level of access (write privileges, in the approval example) than it is desirable to grant a particular user for other purposes. Therefore, there is a need for an effective way to provide controlled access to manage content in some application contexts but not others.

BRIEF DESCRIPTION OF THE DRAWINGS

Various embodiments of the invention are disclosed in the following detailed description and the accompanying drawings.

FIG. 8A is a block diagram illustrating an embodiment of an access control list.

FIG. 8B is a block diagram illustrating an embodiment of an access control list.

FIG. 8C is a block diagram illustrating an embodiment of an access control list.

FIG. 8D is a block diagram illustrating an embodiment of an access control list.

FIG. 10 is a block diagram illustrating an embodiment of an access control list in which a dynamic group has been specified.

FIG. 12 is a block diagram illustrating an embodiment of an access control list.

DETAILED DESCRIPTION

Figure 1:
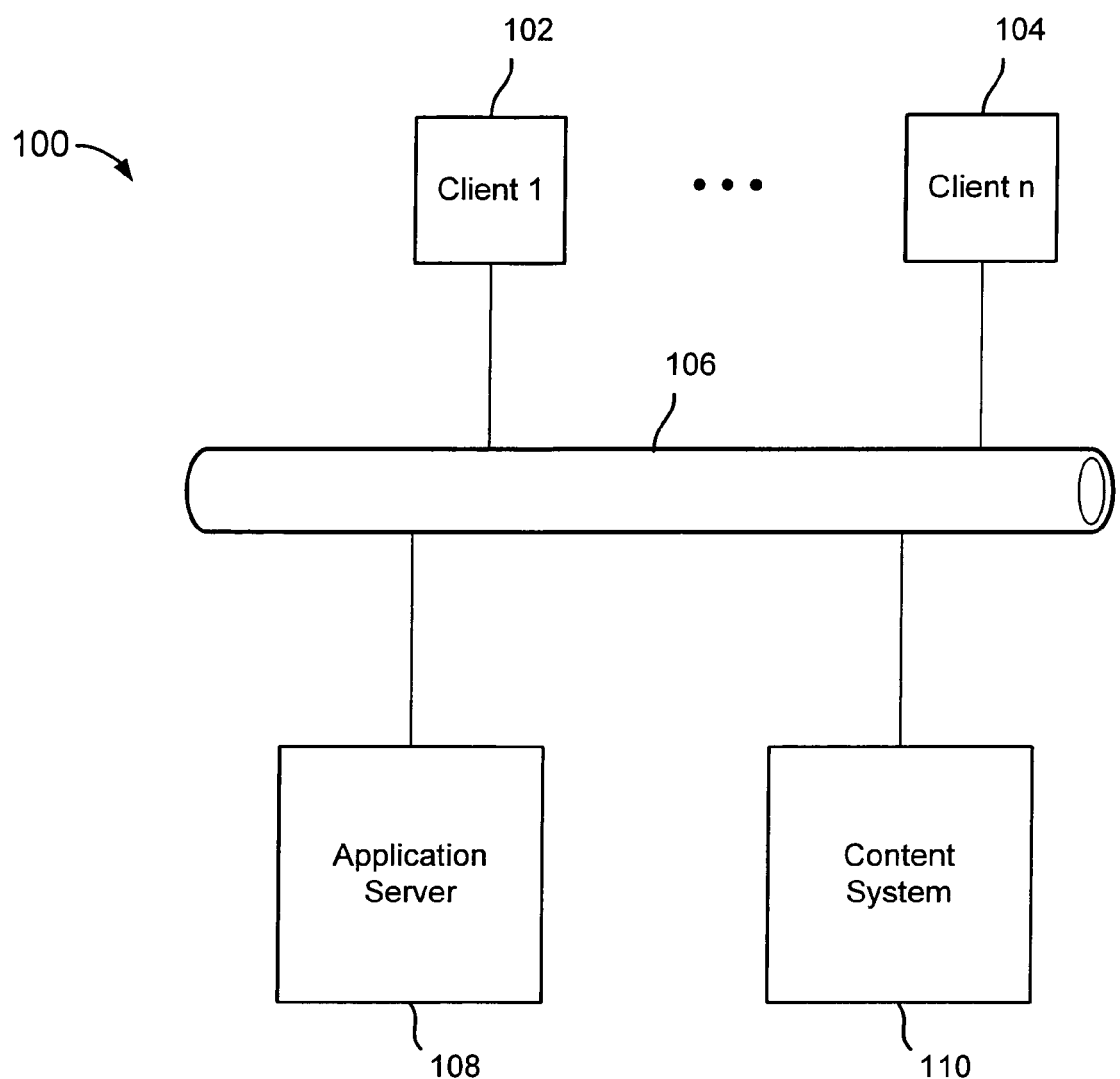
FIG. 1 is a block diagram illustrating an embodiment of a system for accessing and using managed content.

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Privileged access to managed content, e.g., by a privileged portion of application code, is disclosed. In some embodiments, a privileged portion of application code manages user access to managed content at a level of access greater than the user would otherwise be afforded. The privileged code moves a content management session up or down in levels of access as required to allow a user to perform through the application one or more specific actions it is desired to permit the user to do in a particular context (e.g., at a particular time in the lifecycle of an item of content and/or a particular point in a business process or work flow), including to permit the user to perform an action it is not desired to let the user perform in other contexts, such as write a particular value to a content item it is not desired to allow the user to write to otherwise. The privileged code indicates to the content management system that the user/session should be moved to a higher level of access, and the application code, if applicable, restricts the user to using the access at that level only to perform certain prescribed actions (e.g., write a value to indicate approval), and not others (e.g., edit arbitrary content). Once the purpose for which privileged access has been afforded has been satisfied, the user/session is moved back down, e.g., to a level associated with the user, as opposed to the greater access level available to the privileged code.

FIG. 1 is a block diagram illustrating an embodiment of a system for accessing and using managed content. One or more clients, represented in the example shown in FIG. 1 by client 102 and client 104, communicate via a network 106, such as a local area network (LAN), with an application server 108, e.g., to access and use an application running on application server 108. In some embodiments, application server 108 hosts one or more applications running on a content management framework or platform associated with managed content to which access is provided via a content system 110. In the example shown, application server 108 communicates via network 106 with content system 110 to access and/or store content items associated with content system 110.

Figure 2:
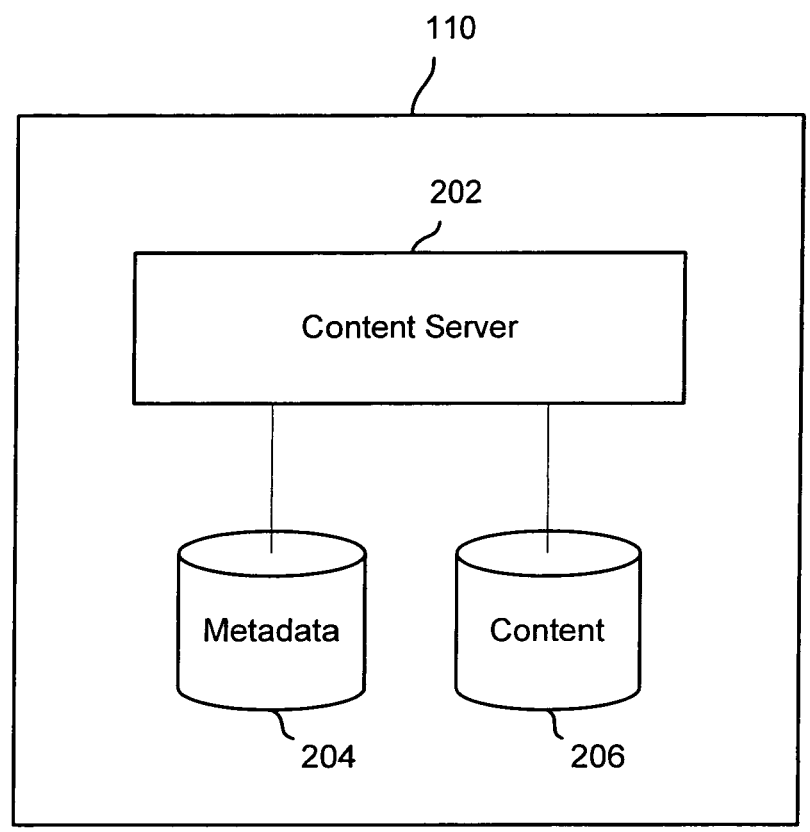
FIG. 2 is a block diagram illustrating an embodiment of a content system.

FIG. 2 is a block diagram illustrating an embodiment of a content system. In the example shown, content system 110 includes a content server 202 configured to provide access to and/or store content items, e.g., files, database tables, etc., stored in content store 206. In various embodiments, content server 202 and content store 206 reside on the same or different physical devices and/or systems, such as on separate servers or other computers. Content server 202 manages content items stored in content store 206 at least in part by associating with each of at least a subset of the content items stored in content store 206 corresponding metadata stored in metadata store 204. In some embodiments, the metadata is stored in the form of one or more software objects configured and used to represent an associated content item within a body of managed content. Examples of metadata include content item owner, author, title, date created, date last accessed, version, content type, file or data format, authoring application, recipient, sender, relationship to other content item(s), keyword(s), etc. In some embodiments, content server 202 uses the metadata to manage (e.g., track) and provide managed access to associated content items, e.g., by executing and returning results for metadata and/or full-text index based queries and providing content management functions such as check-in/check-out, versioning, save, delete, etc.

In some embodiments, one or more objects to represent a content item in metadata store 204 are created by and/or in response to a request from an application running on an associated content management framework (e.g., foundation classes, business logic, and/or API). For example, an application may populate and/or provided data values for metadata object attributes and/or provide the associated content and/or indicate to the content server a location (e.g., on the application server and/or an associated client) where the content is located. The content server stores the content in content store 206 and associates the content as stored in content store 206 with the corresponding metadata in metadata store 204.

Figure 3:
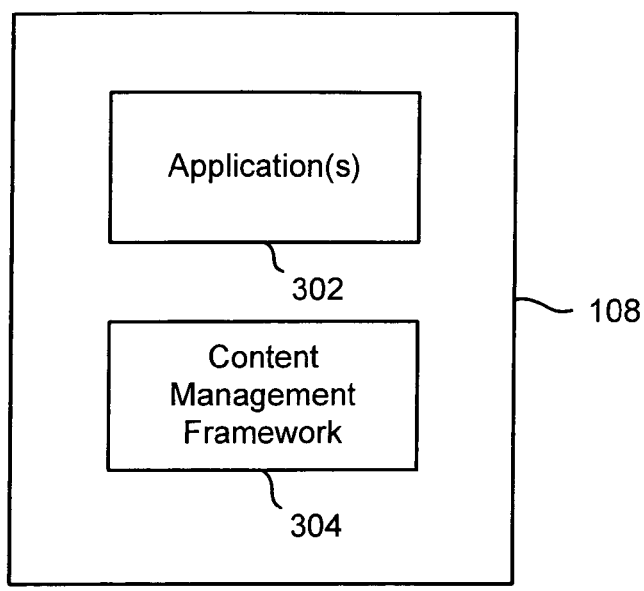
FIG. 3 is a block diagram illustrating an embodiment of an application server.

FIG. 3 is a block diagram illustrating an embodiment of an application server. In the example shown, application server 108 includes one or more applications 302 running on a content management framework 304. The application(s) use(s) the content management framework 304, e.g., an API, foundation Java classes, core content management logic and/or services, etc., to store and access managed content.

Figure 4:
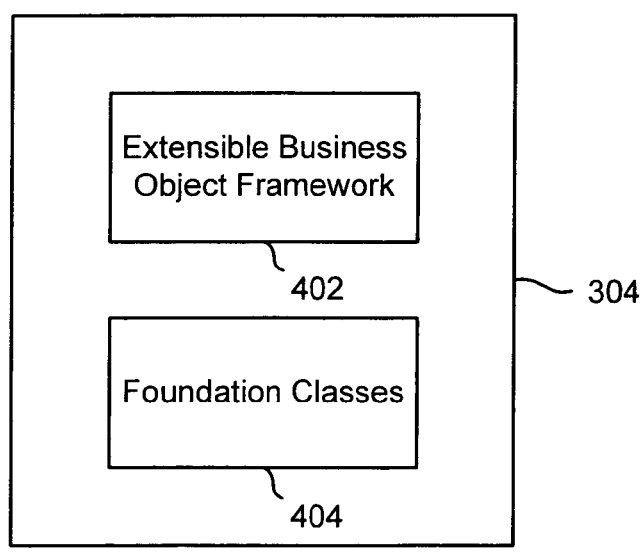
FIG. 4 is a block diagram illustrating an embodiment of a content management framework.

FIG. 4 is a block diagram illustrating an embodiment of a content management framework. In the example shown, content management framework 304 includes an extensible business object framework 402 and foundation (e.g., Java object) classes 404. In some embodiments, the business object framework 402 comprises part of foundation classes 404. The business object framework 402 in some embodiments enables an application developer, application or other code, or another user to define access restrictions to be associated with an item of content, e.g., by specifying access rights and/or restrictions to be included in an access control list (ACL) or like structure associated with, the item of content. In some embodiments, an ACL is linked to and stored with metadata associated with the item(s) of content to which the ACL applies. In some embodiments, an ACL is implemented as a software object stored persistently with, e.g., in a metadata store such as a database, and linked to an implementation object configured to represent and/or provide content management functionality with respect to one or more associated items of content.

In some embodiments, business logic and/or services associated with and/or comprising business object framework 402 enforce access restrictions. Methods requiring access of a content item are configured and/or modified or supplemented as required, at the business logic/platform level, to enforce restrictions. For example, in some embodiments a query is modified, if applicable, to ensure that only results a user/process associated with the query is permitted to access are returned, e.g., by adding to a query a "where" clause that ensures that the results return include only items that (1) satisfy one or more search criteria indicated by a user and (2) the user has a right to access (e.g., view or browse). In some embodiments, session data is used to determine whether access to a particular content item(s) should be granted. An application seeking to access managed content on behalf of a user (individual, system, client or other application, process, etc.) obtains from the user and/or provides to the content management system a credential, such as a user/account name and password, and establishes with the content management system a session through which access to managed content can be requested and/or provided. The content management system maps the credential data to a set of access qualifying data for the session, e.g., by identifying any user name or other identifier, group memberships, roles, or other information by which in a given installation a user may be granted access rights. Requests received by the content management system (e.g., business logic, content server, etc.) from an application are associated with a corresponding session and access is granted to the extent authorized for that session. For example, in a session associated with a user "Bob" who is a member of the "Engineering Group", access in some embodiments would be granted only to content items for which the corresponding ACL grants rights explicitly to "Bob", the "Engineering Group", or both. Realizing security/access restrictions at the business logic/content management platform level ensures that such measures are applied uniformly regardless of the application and/or other vehicle used to access (or attempt to access) content.

Figures 5, 6:
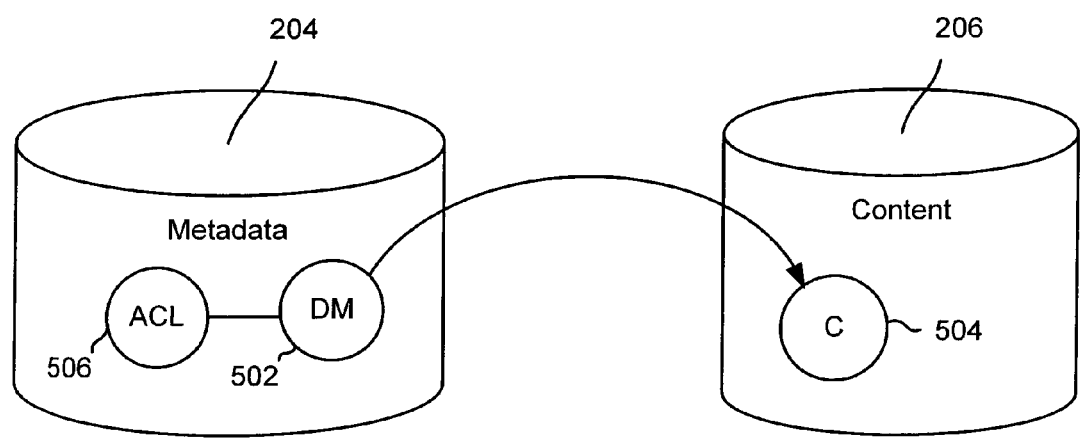
FIG. 5 is a block diagram illustrating an embodiment of elements associated with a content system.
FIG. 6 is a block diagram illustrating an embodiment of an access control list.

FIG. 5 is a block diagram illustrating an embodiment of elements associated with a content system. In the example shown, an implementation object 502 stored in metadata store 204 is associated with a corresponding content item 504 stored in content store 206. The implementation object 502 represents the content item 504 in a body of managed content with which both are associated. FIG. 5 illustrates a simple example in which there is a one-to-one relationship between implementation object 502 and content item 504, but in some embodiments a single implementation object (or related set of objects) may be associated with two or more content items and/or a single content item may be associated with two or more implementation objects (e.g., to avoid duplicative storage of content). In the example shown, access control is provided at least in part by associating (e.g., linking) with implementation object 502, in metadata 204, ACL object 506. In some embodiments, ACL object 506 includes data indicating one or more access rights and/or restrictions for one or more users and/or groups of users. In some embodiments, certain methods and/or operations associated with a content management system with which the elements shown in FIG. 5 are associated access attributes and/or invoke methods of ACL object 506 to ensure that access rights/restrictions specified by/through ACL object 506 are enforced. In the query example described above, for example, in some embodiments access right/restriction data associated with ACL object 506 would be used to ensure that only content items a user associated with a session with which a query is associated are included in results returned in response to the query. In some embodiments, a call to a method associated with implementation object 502, such as to create a new version and/or check associated content item 504 in/out, are intercepted and/or not (fully) executed unless the user/session with which the call is associated has the access rights required, as determined by checking the data and/or invoking one or more methods of ACL object 506. In some embodiments, the called method of implementation object 502 is configured to check an attribute and/or invoke a method of ACL object 506 to determine if the user/session has the required access rights.

In some embodiments, the access privileges granted, e.g., through an ACL such as ACL object 506 of FIG. 5, may include rights/privileged expressed as one or more hierarchical or extended (non-hierarchical) "permits". Examples of hierarchical permits, listed in order from least to greatest access rights, include the following: none (no rights); browse (e.g., see metadata or summary data but not underlying content); read (view contents); relate (e.g., link to other contents/objects/contexts/logical structures); version (e.g., can save and edit as a new version but cannot save changes to original); write (e.g., can edit current version/instance and saved edited content in place of original); and delete (e.g., can delete content and/or associated metadata). In some embodiments, unless otherwise indicated a grant of a hierarchical access permit gives to the recipient of the grant the privileges associated with the permit and those of all levels below the granted permit in the hierarchy of permits. In the above example, a user granted "write" privileges with respect to a content item could also browse, read, relate, and version the content item. In some embodiments, in addition to and/or instead of hierarchical permits, one or more non-hierarchical (sometimes referred to herein as "extended") permits may be granted. For example, in some embodiments, an "extended delete" permit may be granted, e.g., to a system or data/backup administrator, to enable the administrator to delete content as allowed/required by a data retention policy without being able to read, write, version, etc., the content. Other examples of extended permits include "change permission" (e.g., limited rights to an author and/or administrator to change the access privileges, within limits, of one or more other users without necessarily giving the author/administrator those privileges, or any others) and "execute" for content items and/or other resources (e.g., application code, business logic, or portions thereof) capable of being executed (e.g., run).

FIG. 6 is a block diagram illustrating an embodiment of an access control list. In the example shown, ACL 600 includes three entries, a first granting "write" access to a user named "Joe", a second granting "read" access to a group named "Eng Dept" (short for "engineering department" in this example), and a third granting "delete" access to a user (or role) named "admin" (short for "administrator" in this example). In some embodiments, a request to "delete" a content item associated with ACL 600 would be allowed only if a session associated with the request were associated with the user "admin". Either "admin" or "Joe" would be permitted to write (e.g., edit and save as the same version) to the content item, and members of the engineering group would be permitted to read, but not write, version, etc., the content item.

Figure 7:
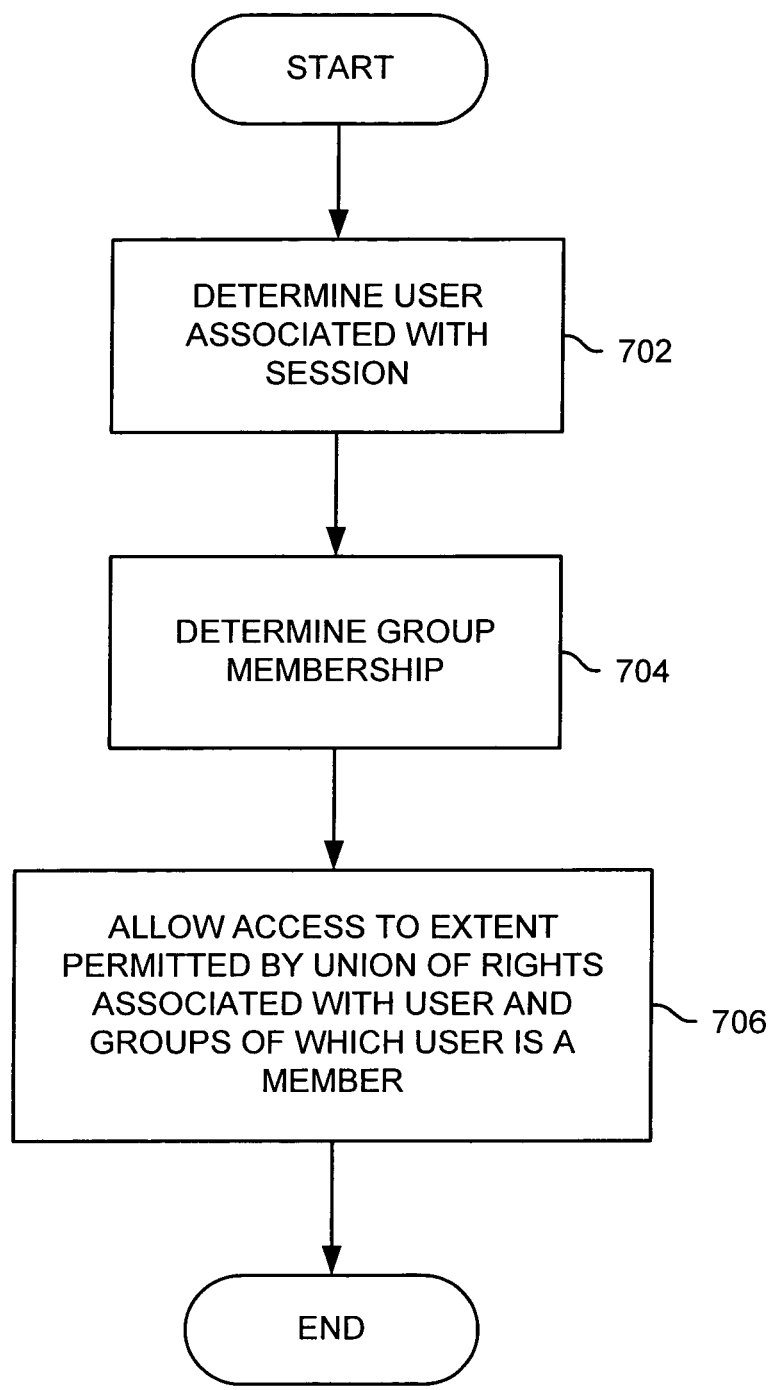
FIG. 7 is a flow chart illustrating an embodiment of a process for controlling access to managed content.

FIG. 7 is a flow chart illustrating an embodiment of a process for controlling access to managed content. In the example shown, at 702 a user associated with a session established or being established or requested to be established with a content management system is determined. In various embodiments, the user may be an individual, a role, a group, a system, a node, and/or an application or other process or logic. At 704, the group memberships, if any and as applicable, of the user determined at 702 are determined. In some embodiments, a user may be a member of one or more groups by virtue of his/her role or title, membership in other groups, and/or being listed individually in a list or other data indicating members of the group(s). For example, an employee "Bob" who is a "manager" in the "engineering depaitment" and assigned to the "Western Region" would be allowed to access a content item for which the ACL granted rights to at least one of "Bob" individually, the "manager" role, the "engineering department" group, and the "Western Region" group. In some embodiments, 706 includes comparing, each time access to a content item is requested, the individual(s), role(s), and group(s) associated with a session with which the request is associated with the grant(s) of rights in an ACL associated with the content item to determine if any entity associated with the session has been granted access at the level required/requested.

Specifying a "required group" of which a user/session must be a member in order to access a content item is disclosed. In some embodiments, the required group is specified in an ACL and enforced by business logic associated with a content management platform. In some embodiments, a user/session that is not a member of a required group is denied access to the content item, even if the user/session would have been allowed access but for not being a member of the required group, e.g., by virtue of an access permit explicitly granted to the user/session, for example in an ACL (or other structure) in which the required group restriction is specified. In some embodiments, if multiple required groups are specified, a user/session must be a member of any/all required groups to gain access. In some embodiments, a hierarchical or other permit is or may optionally be specified for a required group. In some embodiments, a user/session that is a member of any/all required groups is granted access at the highest level for which the user/session qualifies by virtue of a permit granted to the user/session in an ACL apart from their membership in any/all required groups, e.g., a permit granted to them individually, by virtue of their role, by virtue of their membership in a group other than a required group, etc.

FIG. 8A is a block diagram illustrating an embodiment of an access control list. In the example shown, ACL 800 includes four entries, a first granting "write" access to "Joe", a second granting "read" access to the "Eng Dept" group, a third granting "delete" access to "admin", and a fourth indicating that "Project Alpha" is a "required group". In this example, the user "Joe" would be granted access only if he were a member of the "Project Alpha" group. If a member of the "Project Alpha" group, Joe would be granted "write" access by virtue of the first entry in ACL 800. Likewise, a member of the "Eng Dept" group would be granted access only if he/she were a member of the "Project Alpha" group. A requesting member of the "Eng Dept" who was also a member of the "Project Alpha" group (and who was not "Joe" or "admin") would be granted "read" access by virtue of the second entry in ACL 800.

FIG. 8B is a block diagram illustrating an embodiment of an access control list. In the example shown, ACL 810 includes four entries, a first granting "write" access to "Joe"; a second granting "read" access to the "Eng Dept" group; a third granting "delete" access to "admin"; and a fourth specifying that the "Project Alpha", "Eng Mgr" (short for "engineering manager in this example), and "QA Team" (short for "quality assurance team" in this example) groups comprise a "required group set". In this example, to gain access a user/session would have to be a member of at least one of the groups comprising the "required group set". For example, "Joe" would be allowed access only if he were a member of at least one of the "Project Alpha" group, the "Eng Mgr" group, and/or the "QA Team" group. If "Joe" were a member of at least one of the three groups comprising the "required group set", he would be allowed "write" access by virtue of the first entry in ACL 810.

FIG. 8C is a block diagram illustrating an embodiment of an access control list. In the example shown, ACL 820 includes four entries, a first granting "write" access to a user named "Joe", a second granting "read" access to a group named "Eng Dept" (short for "engineering department" in this example), a third specifying a "read restrict" limitation on the rights of "Mark", and a fourth granting "delete" access to a user (or role) named "admin" (short for "administrator" in this example). In this example, even if "Mark" were a member of the "Eng Dept" group, he would not be granted "read" access to a content item associated with ACL 820. Such a restriction may be useful, e.g., to avoid giving a user access to content associated with projects from which the user has been segregated for ethical, legal, business, or other reasons, e.g., to ensure that a key product is not tainted through involvement by an employee recruited and/or hired away from a competitor, or where a user cannot be allowed to access the content due to a personal, professional, or other conflict of interest.

FIG. 8D is a block diagram illustrating an embodiment of an access control list. In the example shown, ACL 830 includes four entries, a first granting "write" access to a user named "Dan", a second granting "read" access to a group named "State Dept", a third indicating that "Top Secret" is a "required group", and a fourth indicating that "European Region" is a "required group". In this example, a State Department employee would be allowed access to a content item associated with ACL 830 only if the employee both had a "top secret" (or higher) security clearance and was associated with the "Europe Region". A State Department employee with a top secret (or higher) clearance but assigned to a region other than Europe would not have access. Likewise, even "Dan", who is specifically delegated "write" access in the first entry, would be denied access unless he had a top secret or higher security clearance and was assigned to Europe. The example shown in FIG. 8D illustrates application in the context of government security marking and access control requirements, such as the Department of Defense Information Security Program, of the "required group" approach described herein, including by providing a mechanism to associate with electronically stored content and enforce access restrictions associated with security classification markings ("Confidential", "Secret", "Top Secret", etc.) and supplemental and/or other applicable associated markings ("US Citizen Only", "Europe Region Only", etc.).

Figure 9:
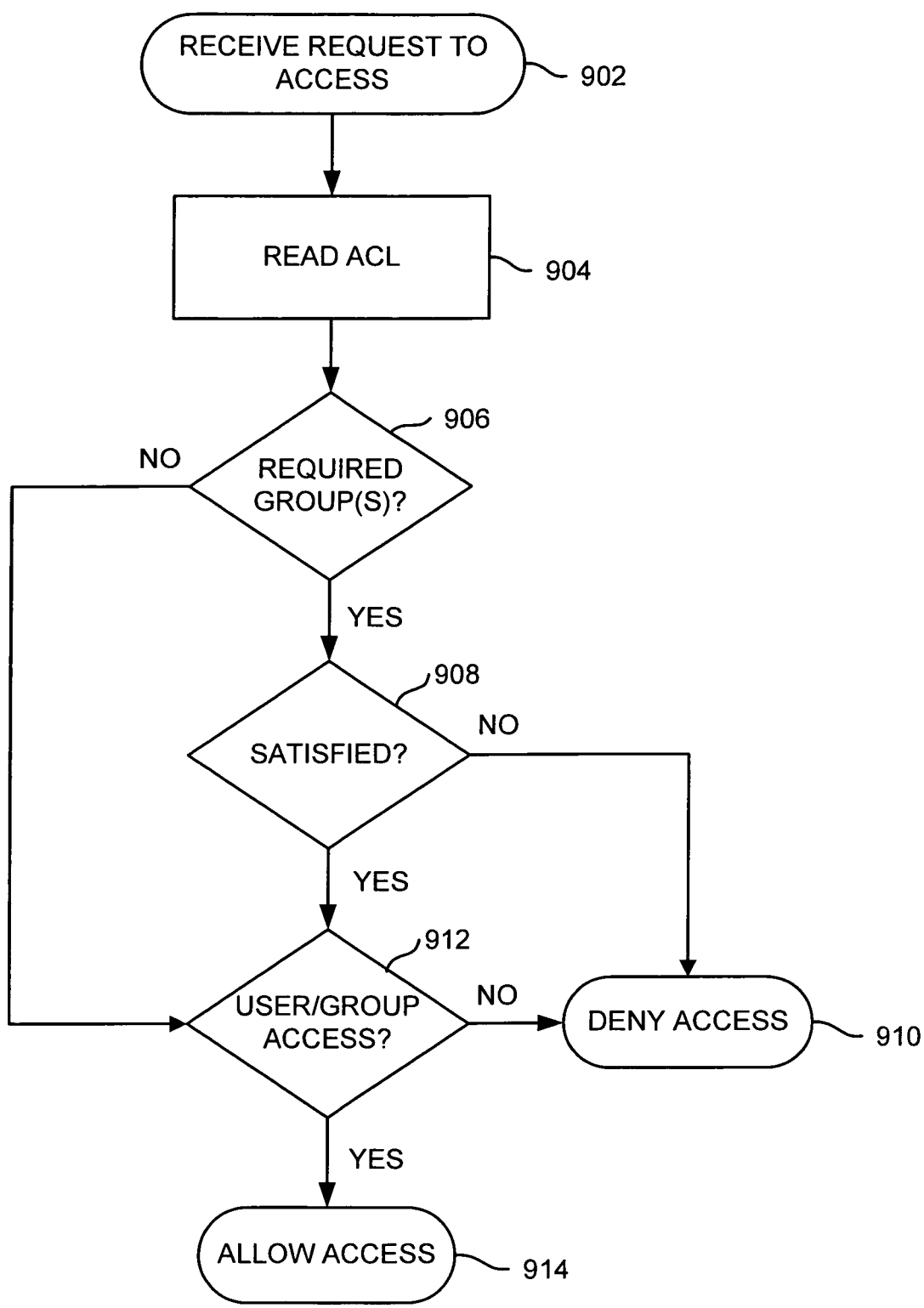
FIG. 9 is a flow chart illustrating an embodiment of a process for controlling access to electronically stored content.

FIG. 9 is a flow chart illustrating an embodiment of a process for controlling access to electronically stored content. In the example shown, at 902 a request to access a content item is received. In some embodiments, the request received at 902 is received by a content management system and/or a component, process, or service thereof. At 904, an ACL associated with the content item is read. It is determined at 906 whether the ACL specifies any required group(s). If so, it is determined at 908 whether all required groups are satisfied. If any require group(s) is/are not satisfied, at 910 access is denied. If all required groups are satisfied, or if there are no required groups, at 912 it is determined whether a user with which the request received at 902 is associated is granted access to the content item apart from satisfying any/all required group(s), e.g., by virtue of an access permit granted in/via the ACL to the user, a role associated with the user, or a group of which the user is a member. If there is no permit that grants access to the user, at 910 access is denied. If the user has been granted access, access is allowed at 914.

FIG. 10 is a block diagram illustrating an embodiment of an access control list in which a dynamic group has been specified. In the example shown, the ACL 1000 is similar to the ACL 830 of FIG. 8D except that the third entry has been changed to identify "top secret" as a "required dynamic group". As in the example shown in FIG. 8D, a user, such as "Dan" or a member of the "State Dept" group, will in the example shown in FIG. 10 only be allowed access if the user is also a member of both the "top secret" required dynamic group and the "Europe Region" required group. The ACL 1000 differs from ACL 830 of FIG. 8D in that a user's membership in the "top secret" group is determined dynamically. In some embodiments, a single determination is made, e.g., at the time a session with the content management system is established, as to whether a user who is a potential member of a dynamic group will be considered a currently valid member of the group, and the user is then treated as either a member for the entire session or as a non-member for the entire session. In some embodiments, membership criteria is or may be reevaluated during the course of a session, and a user moved in or out of member (as opposed to potential member but not currently treated as a member) status with respect to a dynamic group. In the example shown in FIG. 10, for example, a user having "top secret" clearance may be treated as a member of the "top secret" group if accessing content during regular business hours from a relatively fixed workstation (e.g., a PC that is not a laptop or other portable computer) known to be located in a physical location (e.g., a building) considered to be secure, but excluded from membership in the "top secret" group if the user logged in from an unknown location, via a mobile network or access point, after hours, etc. In some embodiments, status as a member or non-member of a dynamic may change during a session, as indicated for example by application or other code. For example, a user and/or an associated session may be moved, e.g., by application code, in and out of dynamic group "member" status based on the user's relationship to particular content, the state of content with respect to a business (e.g., approval/review) process, etc., and/or additional credentials provided by the user at different points in a session, e.g., a password associated with a particular content item.

Figure 11:
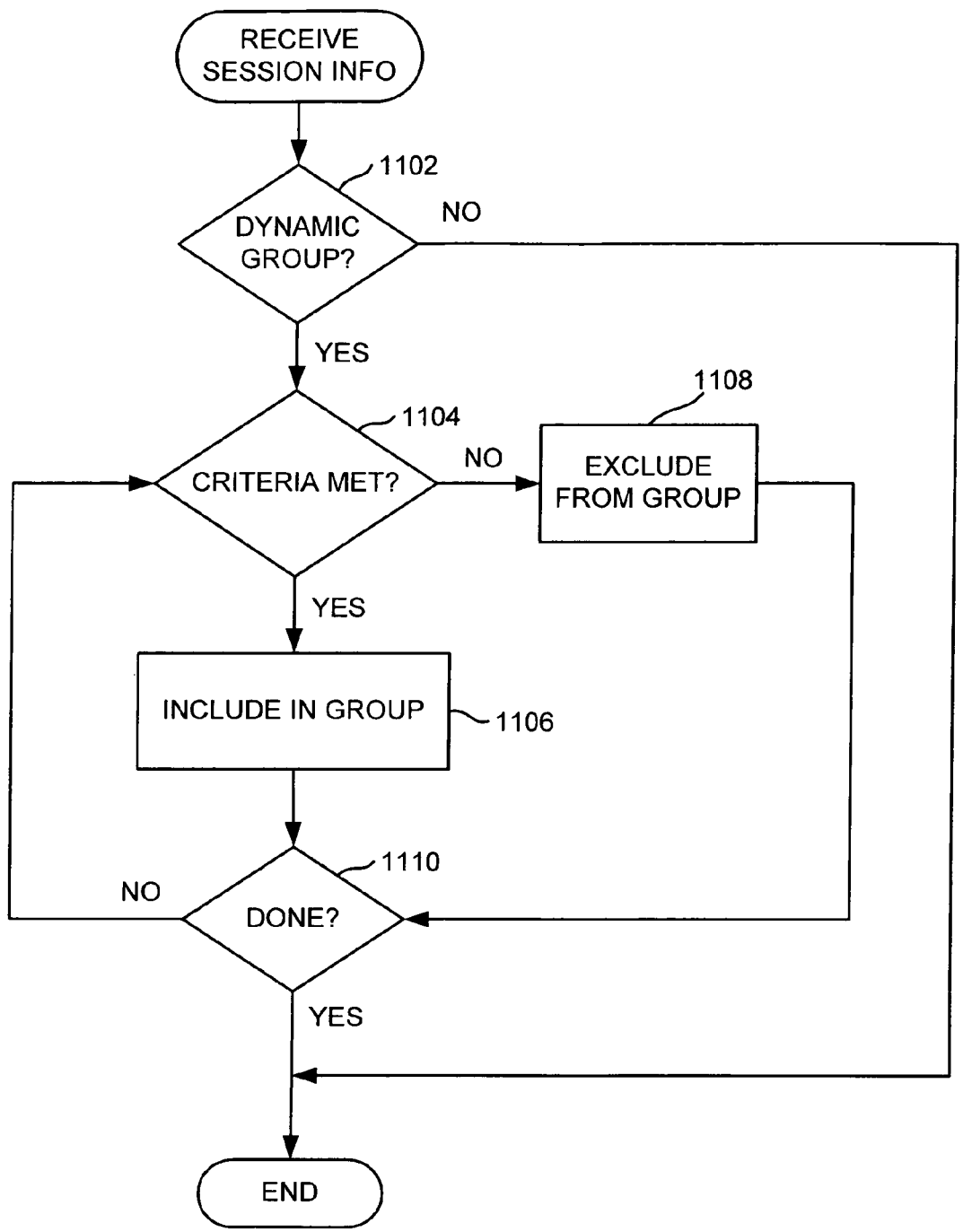
FIG. 11 is a flow chart illustrating an embodiment of a process for dynamic control of access to managed content.

FIG. 11 is a flow chart illustrating an embodiment of a process for dynamic control of access to managed content. In the example shown, a login request (or in some embodiments, an request to access a content item, or some other action triggering evaluation or reevaluation of membership in a dynamic group) is received, and at 1102 it is determined whether the user is a potential member of any dynamic group associated with the request, content implicated by the request, a session with which the request is associated, etc. If the user is not a potential member of any applicable dynamic group, the process of FIG. 11 ends and access rights/restrictions are enforced normally, e.g., as in FIG. 7 and/or FIG. 9. If the user is a potential member of a dynamic group, it is determined at 1104 whether applicable criteria for considering the user to be a currently valid member of the dynamic group, e.g., for purposes of an associated current session, are met. If it is determined that one or more criteria required for inclusion in the dynamic group are not met, at 1108 the user is excluded from currently valid membership and treated as a non-member of the group. If the criteria for being considered a currently valid member of the dynamic group is/are satisfied, at 1106 the user (e.g., for purposes of an associated session) is treated as being a currently valid member of the dynamic group, and afforded access to managed content as if a member of the dynamic group. If the user is initially or subsequently excluded at 1108 and/or included at 1106, in the example shown the determination made at 1104 is repeated if applicable information changes, and 1104, 1106, and/or 1108 may be repeated, as applicable, until the user session is terminated and/or it is otherwise determined at 1110 that there is no longer a need to monitor the user's status as a currently valid member or not of the dynamic group.

The use of dynamic groups, as disclosed herein, enables context information, including context information that may vary between and/or within sessions for a particular user, to be used to determine dynamically whether a user who has been identified as a potential member of a dynamic group should be considered during a particular session and/or at a particular point in a session to be a currently valid member of the dynamic group and allowed access to managed content to an extent associated with the dynamic group.

FIG. 12 is a block diagram illustrating an embodiment of an access control list. In the example shown, ACL 1200 includes four entries, a first granting "write" access to a user named "Allan", a second granting "read" access to a group named "Eng Mgr" (short for "engineering manager"), a third granting "write" access to an "Approval Application", and a fourth granting "delete" access to a user/group/role named "Admin". In the example shown, the "approval application" includes privileged code configured to move a user/session, such as a session associated with a member of the engineering manager group, from a lower level of access associated with the user, such as the "read" access associated with the user by virtue of being a member of the "Eng Mgr" group, to a higher level associated with the privileged code, e.g., the "write" access granted to the "Approval Application". In this example, an engineering manager user's session is moved to the approval application level of access to enable under prescribed circumstances, determine by the application, to enable the user to perform a task requiring the higher level of access, such as writing a data value indicating the content has been reviewed and approved by the engineering manager. In some embodiments, a grant of access to privileged code is made by configuring a dynamic group and list as potential members those users/groups of users to whom the higher level of access may be desired to be granted. If/when the higher level of access associated with the privileged code is required, the privileged code (or associated application code) moves the user's session to a level associated with the privileged code, e.g., by indicating to the content management system that the user should now be considered an active/currently valid member of the dynamic privileged code group. Once made a currently valid member, the user has access at the level of the privileged code group, "write" access in this example. In some embodiments, the privileged application code ensures that the user only performs those operations it is intended for the user to be able to perform at that access level (writing the approval indication, in this example) and not other actions that could otherwise be done at that access level (e.g., editing other parts of the content). Once the action requiring the higher level of access has been completed, the privileged application code moves the session back to the user's level, in this example by indicating to the content management system that the user/session should no longer be considered an active/currently valid member of the privileged code dynamic group. In some embodiments, the privileged code is configured to provide to the content management system, and the content management system requires, a credential that demonstrates to the content management system that a request to move a user/session to a level of access associated with the privileged code has been received from the privileged code, and not some other code or other source.

Figure 13:
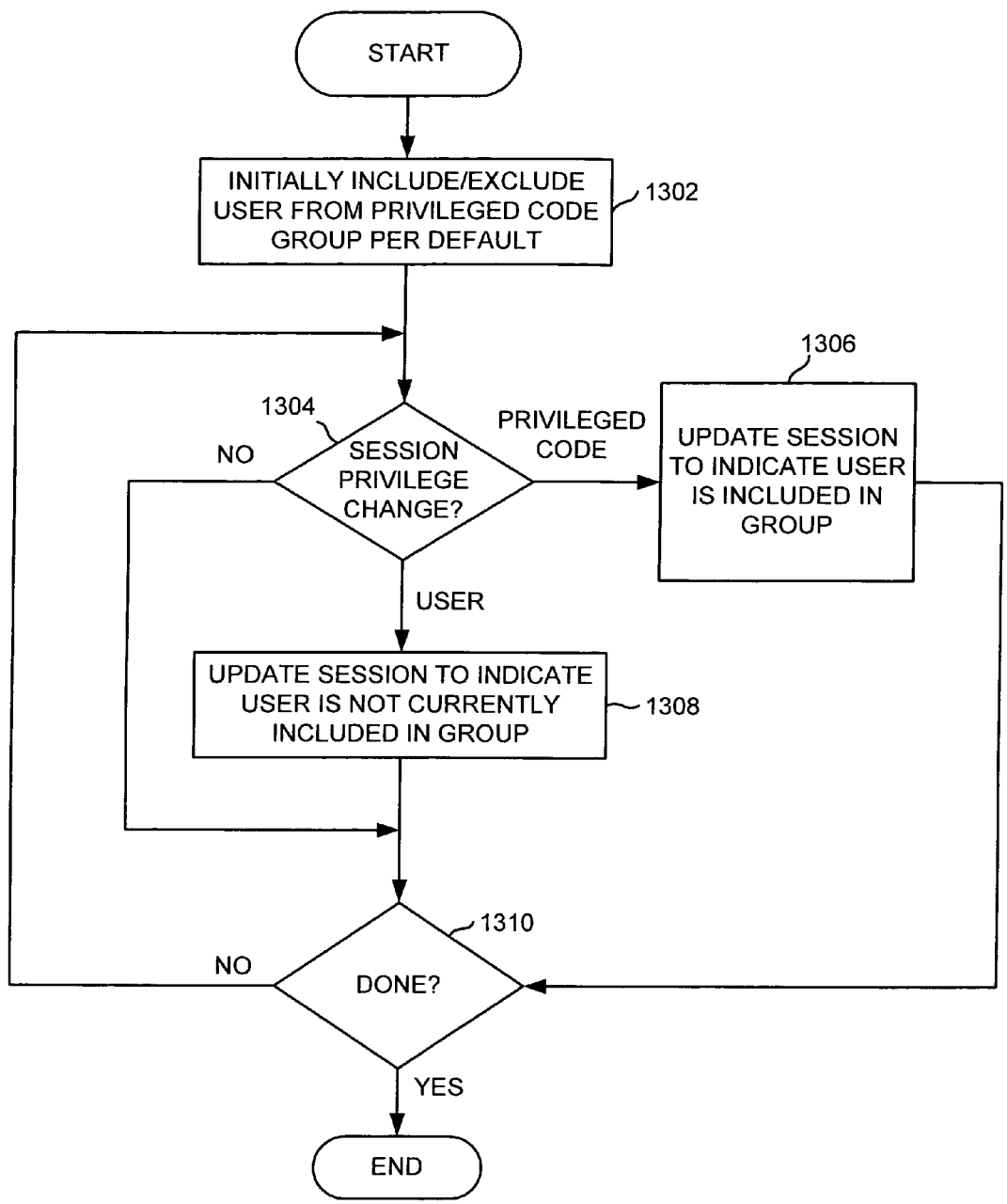
FIG. 13 is a flow chart illustrating an embodiment of a process for managing privileged access to manage content.

FIG. 13 is a flow chart illustrating an embodiment of a process for managing privileged access to manage content. In some embodiments, the process of FIG. 13 is implemented at least in part by application or other privileged code associated with an application running on a content management platform/framework, such as application server 108 of FIG. 1. In the example shown, when a user session with a content management system initially is established, the user is either included/excluded from a dynamic group associated with privileged code. In some embodiments, a user initially is excluded from the privileged code dynamic group and only upgraded to privileged access in response to an indication from the privileged code that such access should be granted. At 1304, it is determined whether the access level associated with the user/session should be changed, i.e., moved up to a level associated with the privileged code or moved down (assuming the user's rights are more narrow than those of the privileged code, which would not necessarily be the case in all embodiments and/or for all users) to a level associated with the user. If it is determined at 1304 for the session should be moved from an access level associated with the user to a level associated with the privileged code, at 1306 session information is updated to indicate the user should be considered a current/active member of the privileged code dynamic group. In some embodiments, at 1306 application code or other privileged code provides to the content management system an indication that a user/session with the content management system should be moved to a level of access associated with the privileged code, e.g., by considering a user with which the session is associated to be a current/active member of a dynamic group associated with the privileged code. If at 1304 it is determined the user/session should be moved from an access level associated with the privileged code to a level otherwise associated with the user, at 1308 the content management session is updated to indicate the user should not be considered currently an active/currently valid member of the privileged code dynamic group. In the example shown, the process of FIG. 13 continues, with 1304, 1306, and/or 1308 repeated as applicable, until at 1310 it is determined that the process is done, e.g., that the application session and/or content management session has/have been terminated, after which the process of FIG. 13 ends.

Enabling application supervised privileged access to managed content enables a higher level of access to manage content to be afford for a limited time and/or purpose, while more narrowly restricting users' access in other contexts.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of controlling access to managed content, comprising:
reviewing a privileged code access control list (ACL) entry associated with a privileged portion of application code;
reviewing a user ACL entry associated with a user;
receiving from a privileged portion of application code an indication that a content management session associated with a user is to be promoted from a first level of access associated with the user ACL entry to a second level of access associated with the privileged code ACL entry based at least in part on the user's particular context;
wherein receiving from a privileged portion of application code an indication that a session associated with a user is to be promoted from a first level of access associated with the user ACL entry to a second level of access associated with the privileged portion of application code includes receiving from the privileged code ACL entry an indication that the user is to be considered with respect to the session a member of a dynamic group associated with the privileged portion of code; and using a processor to allow a request associated with the content management session to perform with respect to a content item an operation that requires the second level of access through an application associated with the privileged portion of application code.

2. The method as recited in claim 1, wherein the privileged portion of application code is configured to limit the user to performing with respect to the content item via the application one or more prescribed operations requiring the second level of access.

3. The method as recited in claim 1, wherein the privileged portion of application code is configured to prevent the user from performing with respect to the content item via the application an operation that having the second level of access would otherwise have entitled the user to perform.

4. The method as recited in claim 1, further comprising:
receiving from the privileged portion of application code an indication that the session is to be demoted from the second level of access to the first level of access; and
denying a subsequent request associated with the session to perform with respect to a content item an operation that requires the second level of access.

5. The method as recited in claim 4, wherein receiving from the privileged portion of application code an indication that the session is to be demoted from the second level of access to the first level of access includes receiving from the privileged portion of application code an indication that the user is no longer to be considered with respect to the session a member of a dynamic group associated with the privileged portion of code.

6. The method as recited in claim 1, wherein receiving from a privileged portion of application code an indication that a session associated with a user is to be promoted from a first level of access associated with the user ACL entry to a second level of access associated with the privileged code ACL entry includes receiving from the privileged portion of code a credential authenticating the received indication as coming from the privileged portion of code.

7. A content management system, comprising:
a communication interface configured to receive from a privileged portion of application code an indication that a content management session associated with a user is to be promoted from a first level of access associated with a user ACL entry to a second level of access associated with a privileged code ACL entry based at least in part on the user's particular context,
wherein receiving from a privileged portion of application code an indication that a session associated with a user is to be promoted from a first level of access associated with the user ACL entry to a second level of access associated with the privileged code ACL entry includes receiving from the privileged portion of application code an indication that the user is to be considered with respect to the session a member of a dynamic group associated with the privileged portion of code;
a processor coupled to the communication interface and memory, and configured to:
review the privileged code ACL entry associated with the privileged portion of application code;
review the user ACL entry associated with the user; and
allow a request associated with the content management session to perform with respect to a content item an operation that requires the second level of access through an application associated with the privileged portion of application code; and
a memory coupled to the processor and configured to provide the processor with stored instructions.

8. The system as recited in claim 7, wherein the privileged portion of application code is configured to limit the user to performing with respect to the content item via the application one or more prescribed operations requiring the second level of access.

9. The system as recited in claim 7, wherein the privileged portion of application code is configured to prevent the user from performing with respect to the content item via the application an operation that having the second level of access would otherwise have entitled the user to perform.

10. The system as recited in claim 7, wherein the communication interface is further configured to receiving from the privileged portion of application code an indication that the session is to be demoted from the second level of access to the first level of access; and the processor is further configured to deny a subsequent request associated with the session to perform with respect to a content item an operation that requires the second level of access.

11. The system as recited in claim 10, wherein receiving from the privileged portion of application code an indication that the session is to be demoted from the second level of access to the first level of access includes receiving from the privileged portion of application code an indication that the user is no longer to be considered with respect to the session a member of a dynamic group associated with the privileged portion of code.

12. The system as recited in claim 7, wherein receiving from a privileged portion of application code an indication that a session associated with a user is to be promoted from a first level of access associated with the user ACL entry to a second level of access associated with the privileged code ACL entry includes receiving from the privileged portion of code a credential authenticating the received indication as coming from the privileged portion of code.

13. A computer program product for controlling access to managed content, the computer program product being embodied in a non-transitory computer readable storage medium and comprising computer instructions for:
reviewing a privileged code access control list (ACL) entry associated with a privileged portion of application code;
reviewing a user ACL entry associated with a user;
receiving from a privileged portion of application code an indication that a content management session associated with a user is to be promoted from a first level of access associated with the user ACL entry to a second level of access associated with the privileged code ACL entry based at least in part on the user's particular context;
wherein receiving from a privileged portion of application code an indication that a session associated with a user is to be promoted from a first level of access associated with the user ACL entry to a second level of access associated with the privileged code ACL entry includes receiving from the privileged portion of application code an indication that the user is to be considered with respect to the session a member of a dynamic group associated with the privileged portion of code; and
allowing a request associated with the content management session to perform with respect to a content item an operation that requires the second level of access through an application associated with the privileged portion of application code.

14. The computer program product as recited in claim 13, wherein the privileged portion of application code is configured to limit the user to performing with respect to the content item via the application one or more prescribed operations requiring the second level of access.

15. The computer program product as recited in claim 13, wherein the privileged portion of application code is configured to prevent the user from performing with respect to the content item via the application an operation that having the second level of access would otherwise have entitled the user to perform.

16. The computer program product as recited in claim 13, further comprising computer instructions for:
   receiving from the privileged portion of application code an indication that the session is to be demoted from the second level of access to the first level of access; and
   denying a subsequent request associated with the session to perform with respect to a content item an operation that requires the second level of access.

17. The computer program product as recited in claim 16, wherein receiving from the privileged portion of application code an indication that the session is to be demoted from the second level of access to the first level of access includes receiving from the privileged portion of application code an indication that the user is no longer to be considered with respect to the session a member of a dynamic group associated with the privileged portion of code.

* * * * *